Jan. 2, 1951 A. W. FRIEND 2,536,272

MAGNETIC RECORDING-REPRODUCING HEAD

Filed Dec. 2, 1948

INVENTOR
Albert W. Friend
BY Morris L. Kahn
ATTORNEY

Patented Jan. 2, 1951

2,536,272

UNITED STATES PATENT OFFICE 2,536,272

MAGNETIC RECORDING-REPRODUCING HEAD

Albert W. Friend, Lawrenceville, N. J., assignor to Radio Corporation of America, a corporation of Delaware Application December 2, 1948, Serial No. 63,044

3 Claims. (Cl. 179—100.2)

My present invention relates to magnetic transducers and particularly to improvements in magnetic "applicators" or "sound-heads" for use in the recording, reproduction and erasing of magnetic phonograph records, especially tape records.

The object of my invention is to provide an improved inductive type magnetic applicator and, more especially, one which shall possess the following features and advantages (*a*) low cost yet rugged construction (*b*) a high degree of stability in the spacing-adjustment of the magnetic and inductive elements of the applicator, (*c*) ability to reject stray fields (*d*) freedom from spaces in which stray particles of magnetic material and dirt might accumulate (*e*) minimum longitudinal span, upon the recording tape of the magnetic core member, and hence maximum capability of handling high-frequency signals (*f*) simplified electrical and magnetic circuit elements to provide maximum efficiency of operation (*g*) a laminar structure to allow for considerable wear without adverse effects upon performance (*h*) a working surface which may be reground and polished to regain the original performance, many times, before being worn beyond useful limits and (*i*) the non-magnetic conductive material placed in close proximity to the induction conductor to minimize the A. C. fringing magnetic flux and thus to improve the high frequency response of the unit.

Figure 1:
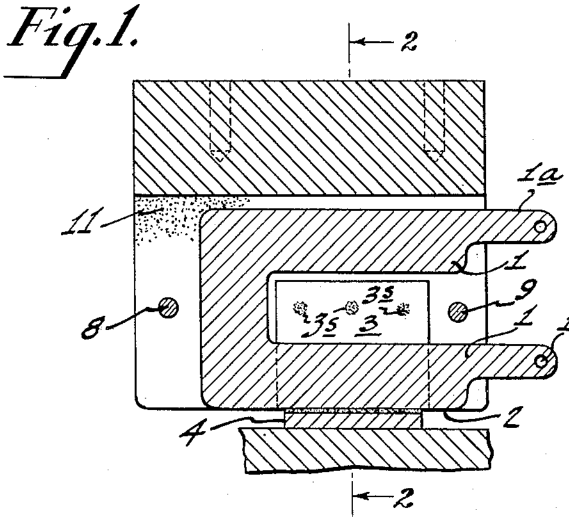
Fig. 1 is a sectional elevation taken on the line 1—1 of Fig. 1

In constructing an inductive type magnetic applicator in accordance with my invention I employ punched sections of sheet materials. Thus, I may start with a U-shape sheet 1 of a good electrical conductor, such as copper, and coat it with a very thin film of a suitable synthetic plastic material such as polyvinyl formal ("Formex"), polyethylene, polystyrene, or the like, and having selected one of the outer edges 2 of the U as the working surface of the applicator I apply one or more correctly shaped stampings 3 of highly permeable ferromagnetic sheet material, such as permalloy or mu metal, over the coated arm of the U adjacent to the said working surface 2.

For optimum results the conducting U-shape sheet or inductive element 1 should be of a thickness substantially less than 0.001 of an inch and the ferromagnetic core material substantially no greater than 0.002 of an inch thick. In one successful embodiment of the invention, the copper inductive element 1 was of the order of 0.0003" thick and the thickness of the core material was approximately 0.002". Thus, my invention provides a very narrow applicator or sound-head element with very little effort of a precision type.

The working surface of the unit which bears against the magnetic tape 4 may be ground and polished, with an intermediate etching process if necessary, to remove burrs at the interface between the core 3 and the induction conductor 1. The oxide naturally present on the core material may provide sufficient insulation with respect to the induction conductor, though I recommend that both the core and the conductor, or one of them, be coated with a very thin insulating layer. The electrical impedance of the unit is low, therefore very little insulation is required.

Figure 3:
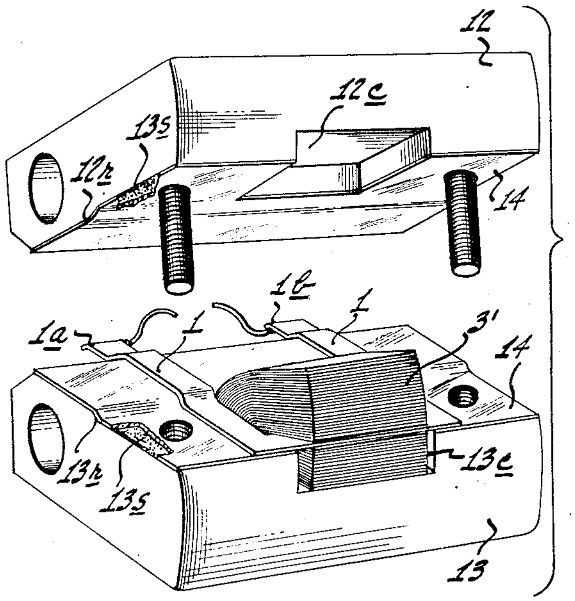
Fig. 3 is a view in perspective of an alternative embodiment of the invention with the non-magnetic casing of the unit removed to reveal the inductive and magnetic elements of the applicator and Fig. 4 is a sectional view of the unit of Fig. 3 with its casing in place.
Figure 4:
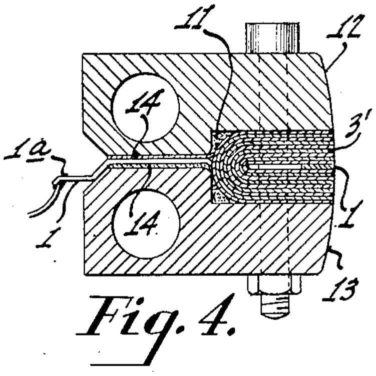

The ferromagnetic core material 3 may comprise two sheets, spot welded together, as indicated by the spots 3*s* (Fig. 1), within the U of the inductive conductor 1, or it may be formed from a single piece of material, bent into a U shape to fit around the said arm of the induction conductor. The latter method is preferable where, as shown in Figs. 3 and 4, the core consists of a number of (say, ten) layers 3' of ferromagnetic material, because it minimizes the required spacing between the two ends of the conducting strip, eliminates some of the labor in assembly and provides a more continuous core structure. In either case the core should be heat-treated after fabrication to anneal it.

Figure 2:
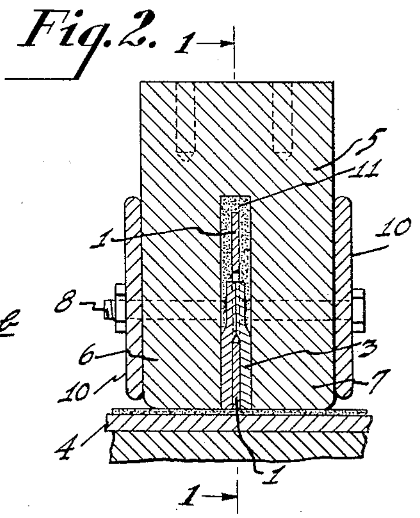
Fig. 2 is a similar view taken on the line 2—2 of Fig. 1 showing an inductive type magnetic applicator constructed in accordance with the principle of the invention with the working surface of the applicator in its normal position contiguous the magnetizable surface of a flexible tape record.

The mounting device or casing for the applicator may assume any of various forms capable of maintaining the magnetic core and inductive conductor elements under clamping pressure. Thus in Figs. 1 and 2 there is shown a bifurcated casing member 5 formed of a single piece of brass, aluminum or other preferably lightweight non-magnetic material, wherein the spacing between its arms 6 and 7 is just sufficient to accommodate the assembled conductor 1 and its core 3. These arms 6 and 7 of the casing are at least slightly flexible and contain a number of aligned holes which accommodate bolts 8 and 9 for applying a clamping force to the assembly. The applicator may be shielded from stray magnetic fields by a band 10 of mu metal or other highly permeable ferromagnetic material surrounding the casing in the region of the inductive element 1 and held in place either by bolts 8 and 9 or by friction, in which later case the interior of the band may be slightly tapered to provide a press fit. As indicated by the stipling at 11 (Figs. 2 and 4) the space within which the inductive element and its core are mounted may be provided with a filling of an initially liquid or semi-solid insulating material which, when dry, forms a solid embedment through which the arms 1*a*, 1*b* of the U-shape conductor extend to the exterior of the casing and comprise terminals for connecting the applicator to an external circuit (not shown).

The casing shown in Figs. 3 and 4 comprises a bi-part block 12—13 of brass or other non-magnetic material and is provided with complementary cavities 12*c*, 13*c*, adjacent to one end within which the mult layer core 3' is received. The conductive inductor element 1 spans the said cavities between the working edges of the central core element of the "stack." The facing surfaces 12*s*, 13*s* of the block may be flat but are preferably provided each with a riser 12*r*, 13*r* adjacent to the rear, the more effectively to clamp the terminal ends 1*a*, 1*b* of the U-shape inductor 1 in place. A plastic coating 14 or a sheet of yieldable insulating material (e. g. mica) are preferably placed between the two halves of the block in front of the risers to support the inductor and hold it in place.

I claim as my invention:

1. An applicator for a magnetizable record, said applicator comprising a U-shape member constituted of a thin sheet of non-ferrous metal mounted to present a portion of its outer edge to said record, a second U-shape member comprising a thin sheet of ferromagnetic material mounted with its closed end between the arms of said first mentioned U-shape member and its free ends on opposite sides of the said edge of said first mentioned U-shape member, and means for applying a clamping force to said U-shape members through the over-lapping portions thereof.

2. The invention as set forth in claim 1 and wherein the free ends of said first mentioned U-shape member comprise electrical terminals for connecting said applicator to an external circuit.

3. The invention as set forth in claim 1 and wherein said clamping means comprises a non-magnetic casing having an opening therein through which the outer edge of said non-ferrous U and the said free ends of said ferromagnetic U are presented to said magnetizable record, and a band of ferromagnetic material surrounding said casing in a position to shield said applicator from stray magnetic fields.

ALBERT W. FRIEND.

REFERENCES CITED

The following references are of record in the file of this patent:

UNITED STATES PATENTS

| Number | Name | Date |
|---|---|---|
| 2,418,542 | Camras | Apr. 18, 1947 |